United States Patent [19]

Choun

[11] Patent Number: 4,889,374
[45] Date of Patent: Dec. 26, 1989

[54] TWO-STAGE AUTOMOBILE BUMPER

[76] Inventor: Sain-Lu Choun, 208, Lin Yun II Village, Leou Shin Village, Shoei Shanq Shiang, Chia Yi Hsien, Taiwan

[21] Appl. No.: 207,205

[22] Filed: Jun. 16, 1988

[51] Int. Cl.⁴ .................. B60R 19/26; B60R 19/28; B60R 19/02; F16F 7/00
[52] U.S. Cl. .................. 293/132; 293/133; 293/137; 267/139; 267/170
[58] Field of Search .................. 267/139, 170, 176; 293/102, 124, 132, 133, 137

[56] References Cited

U.S. PATENT DOCUMENTS

| | | | |
|---|---|---|---|
| 2,553,237 | 5/1951 | Camarero | 267/170 |
| 2,997,325 | 8/1961 | Peterson | 293/133 |
| 3,785,679 | 1/1974 | Peterson et al. | 293/102 X |
| 3,905,629 | 9/1975 | Kwong | 267/139 X |
| 3,961,818 | 6/1976 | Roth, Jr. | 293/137 X |

FOREIGN PATENT DOCUMENTS 2344100  5/1974  Fed. Rep. of Germany ...... 293/133

Primary Examiner—Robert J. Oberleitner
Assistant Examiner—Richard Potosnak
Attorney, Agent, or Firm—Larson and Taylor

[57] ABSTRACT

A two-stage automobile bumper comprising two buffers set in two inner supporting frames which are supported in two outer supporting frames welded at the front of the chassis and a bumper fixed at the front end of the buffers. When the bumper receives a shock, pins combining the buffers with said inner supporting frames are to be cut into two pieces and coiled springs are to be compressed to absorb the shock force.

4 Claims, 4 Drawing Sheets

TWO-STAGE AUTOMOBILE BUMPER

BACKGROUND OF THE INVENTION

Traditional automobile bumpers are commonly welded with the chassis to protect automobiles from shocks caused by accidents and also to protect the drivers from harm. But they have little proper action as a buffer to avoid a strong shock. A bumper equipped with an oil pressure has once been made by some makers to furnish a bumper with some shock absorbing movement. However, as the oil stored in the bumper is finite, the oil pressure can make the bumper move quickly back and forth repeatedly to easily cause a concussion to the driver's brain when a colliding accident should happen to the car. And a concussion of a brain does not occur in case of a collision only.

Therefore, this two-stage automobile bumper of the present invention has been devised to supply a kind of improved bumper for cars.

SUMMARY OF THE INVENTION

This invention concerns a two-stage automobile bumper which comprises two outer supporting frames welded with the chassis, and an inner supporting frame contained in each outer supporting frame. Said inner supporting frame is provided with an upper guide way and a lower guide way, said upper guide way being for containing a buffer which is combined with a bumper at its front end and with a slide block at its bottom. A coiled spring is placed between the slide block and the rear end of the inner supporting frame. In case the bumper receives a shock, it pushes the buffer so that the buffer slides backward in the lower guide way and the pins keeping the buffer at its position in the upper guide way are shorn by the buffer. In addition, the coiled spring is compressed by the slide block pulled by the buffer, and then said spring resiliently extends back, which makes up a shock absorbing action.

BRIEF DESCRIPTION OF THE DRAWINGS

This invention will now be described in detail with reference to accompany drawings wherein.

DETAILED DESCRIPTION OF THE INVENTION

Figure 1:
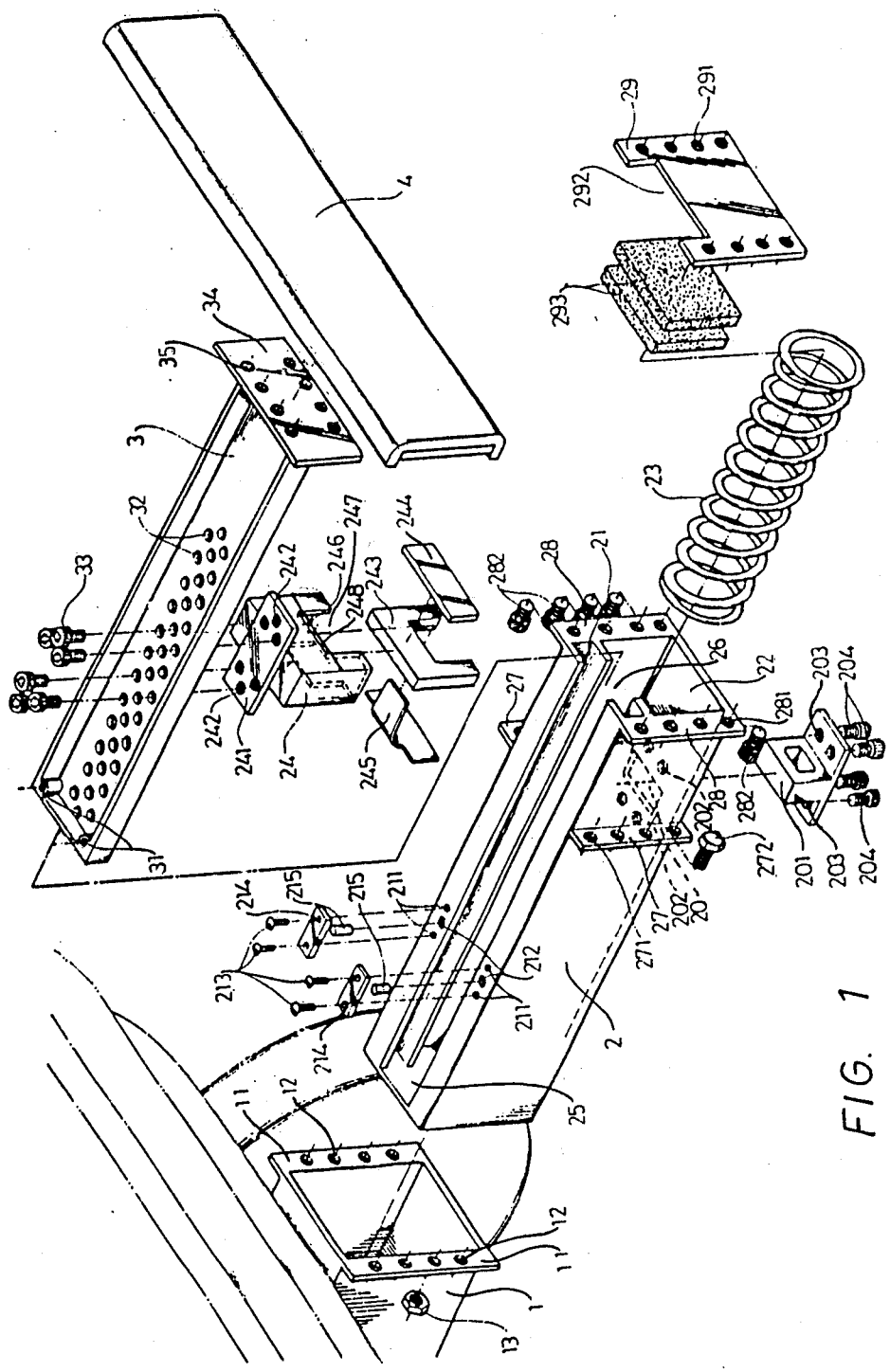
FIG. 1 is an exploded perspective of the two-stage automobile bumper in accordance with the present invention.

This two-stage automobile bumper comprises, as shown in FIG. 1, two outer supporting frames 1 welded with the chassis and protruding forward, two inner supporting frames 2 contained in said outer supporting frames 1, a buffer 3 fixed in each of said inner supporting frames 2 and a bumper 4 assembled at the front end of said buffers 3.

The outer supporting frames 1 are welded together with the front end of the chassis, one at the right and the other at the left, for containing and supporting the inner supporting frames 2 and provided with a flange 11 at its front end bored with round holes 12 for combining together said outer supporting frames 1 with said inner supporting frames 2 by means of bolts 272 and nuts 13.

Next, the inner supporting frames 2 are contained and supported in the outer supporting frames 1, and provided with an upper guide way 21 and a lower guide way 22. Said upper guide way 21 is for a buffer 3 to be movably inserted therein, and said lower guide way 22 is for setting a coiled spring 23 and a slide block 24 therein. Both sides of the upper face of said upper guide way 21 are separately provided with two screw holes 211 and a round hole 212 between said two screw holes 211. Screw holes 211 are for fixing a lid 214 on said inner supporting frames 2 with screws 213, and said round hole 212 is for a pin 215 to insert in so that said pin 215 can stick in an assembly hole 31 in the buffer 3 so as to keep steady the buffer 3 in said upper guide way 21.

In addition, said inner supporting frames 2 are provided with a sealed rear end 25 and an empty hole 26 between said upper guide way 21 and said lower guide way 22, and with two flanges 27, 28 respectively near the front end and at the front end. Said flange 27 is provided with screw holes 271 for assembling solidly said inner supporting frame 2 with said outer supporting frame 1 with screws 272, and said flange 28 is provided with screw holes 281 for fixing a face-plate 29 on by means of screws 282 and screw holes 291. Said faceplate 29 is provided with a notch 292 at the upper part corresponding to the upper guide way 21 so that the buffer 3 can never be hampered in moving in said way 21 freely back and forth.

The lower guide way 22 is provided with a rectangular hole 20 at the bottom for a stop block 201 to be inserted therein from the underside and there to be protruding in said way 22. Said stop block 201 is fixed at the bottom of said way 22 by means of screws 204 and screw holes 202 and round holes 23 corresponding to each other.

Next, the buffer 3 is movably set in the upper guide way 21 and kept at its position steady in the inner supporting frame 2 by means of two pins 215 stuck in the assembly holes 31 and the round holes 212. The buffer 3 is also provided with a plurality of positioning holes 32 for combining the slide block 24 with the buffer 3 with screws 33. The slide block 24 is hollow and reverse U-shaped and welded with a limit piece 241 at its top. The limit piece 241 together with the slide block 24 are combined with the buffer 3 by means of the screws 33 and screw holes 242. In addition, a reverse U-shaped block 243 and a limit plate 244 are contained in the slide block 24 and constrained at their positions by a reverse L-shaped plate 245 such that both of them cannot fall off. The standing-up part of the reverse L-shaped plate 245 stands on the bottom of the lower guide way 22, and the horizontal part is received above the upper end of a steel wire 246 which is welded at one side face of the slide block 24. There also is a proper gap 248 between said wire 246 and the notch 247 of the slide block 24 so as to allow insertion of the reverse L-shaped plate 245. A faceplate 34 is provided at the front end of the buffer 3 in order that the bumper 4 can be fixed together with the buffer 3 by means of screws and round holes 35.

Figure 2:
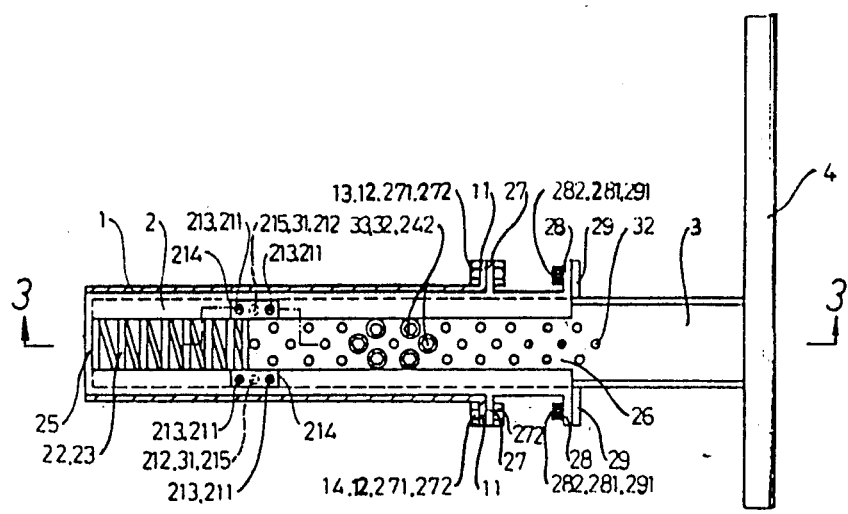
FIG. 2 is a top view of the two-stage automobile bumper in accordance with the present invention.
Figure 3:
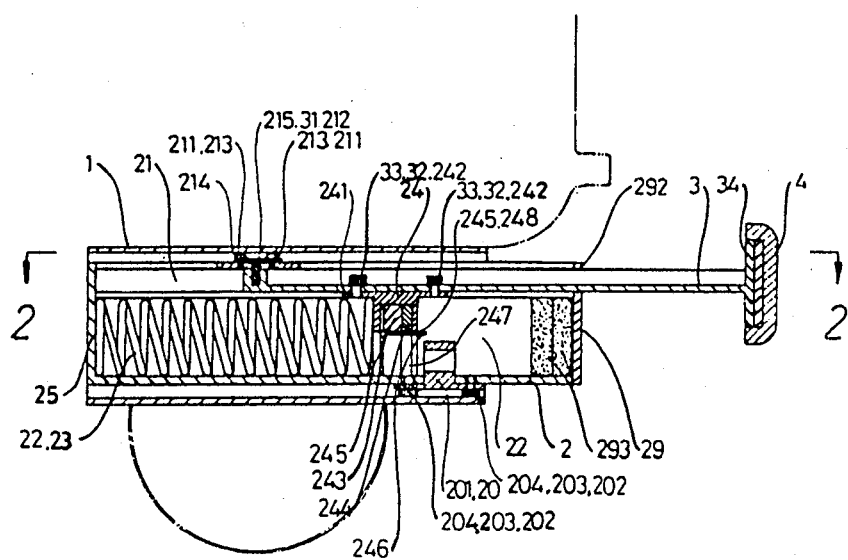
FIG. 3 is a cross-sectional view taken along line 3—3 of FIG. 2.

Now, referring to FIGS. 2 and 3, under the circumstance that the bumper 4 has not received a shock yet, the coiled spring 23 and the slide block 24 are inside the lower guide way 22 of the inner supporting frame 2. One end of said spring 23 rests on the rear end 25 of the inner supporting frame 2 and the other rests at the slide block 24. The buffer 3 is inside the upper guide way 21 positioned by the pins 215 and extending out of the car. In addition, two layers of sponge 293 are attached on the faceplate 29 at the front of the lower guide way 22. The slide block 24 including the reverse U-shaped block 243 and the limit plate 244 is at the position higher than that of the stop block 201.

Figure 4:
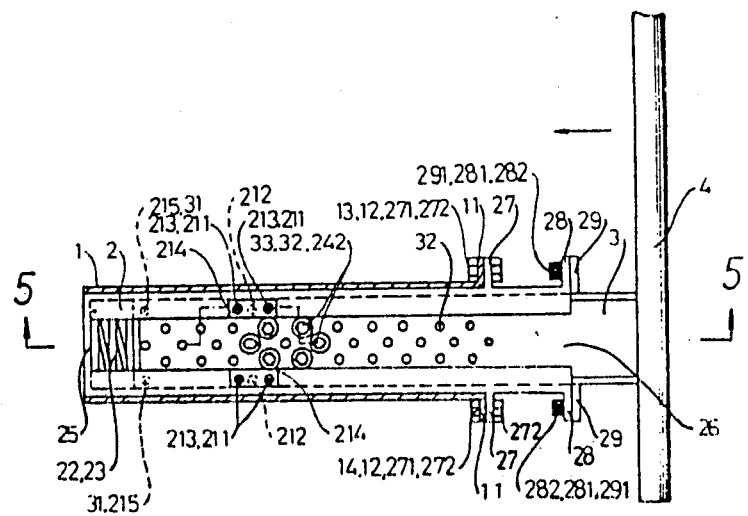
FIG. 4 is a cross-sectional view taken along line 4—4 of FIG. 5.
Figure 5:
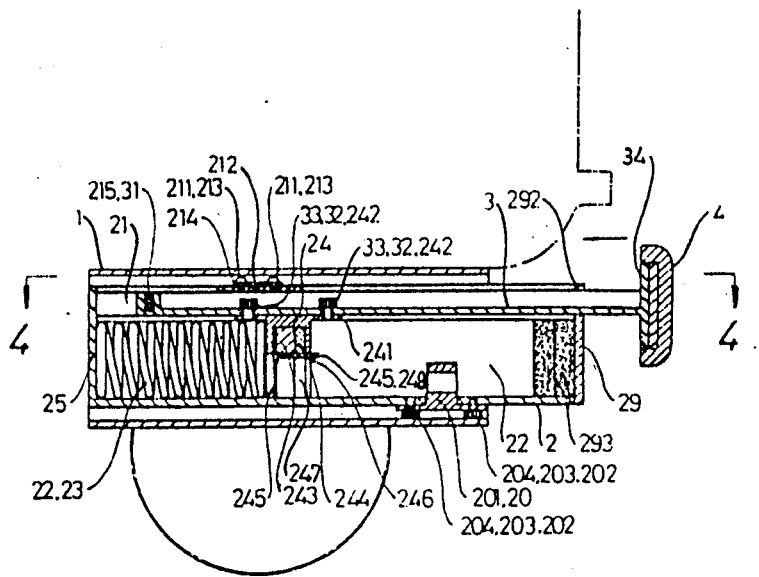
FIG. 5 is a cross-sectional view taken along line 5—5 of FIG. 4.

Next, referring to FIGS. 4 and 5, under the circumstance that the bumper 4 has received a shock, the bumper 3 is pushed backward as the arrow marked in the figures indicates so that the pins 215 are cut into two pieces by the shearing force cause by the backward movement of the buffer 3. Simultaneously the slide block 24 is carried backward by the buffer 3 to compress the coiled spring 23 to the largest limit it can endure. Thereafter, said spring 23 could resiliently extend to its original position, i.e. forward.

Figure 6:
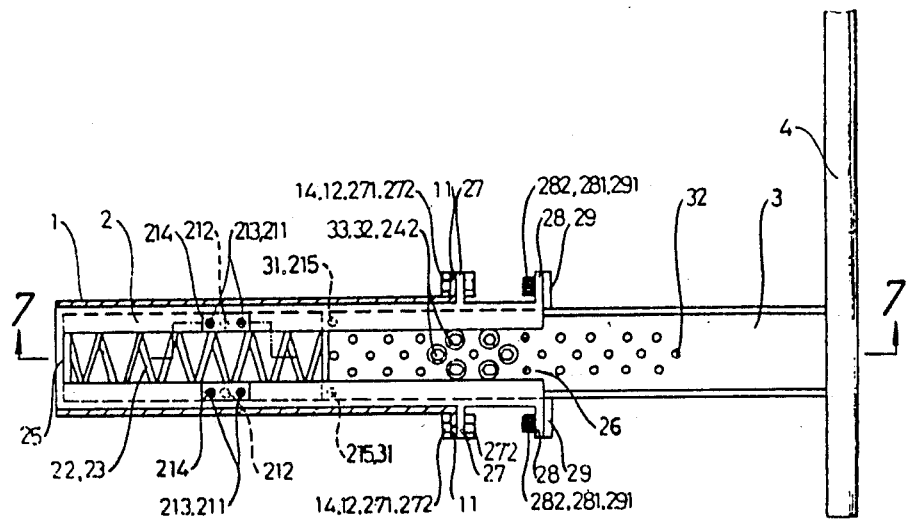
FIG. 6 is a cross-sectional view taken along line 6—6 of FIG. 7.
Figure 7:
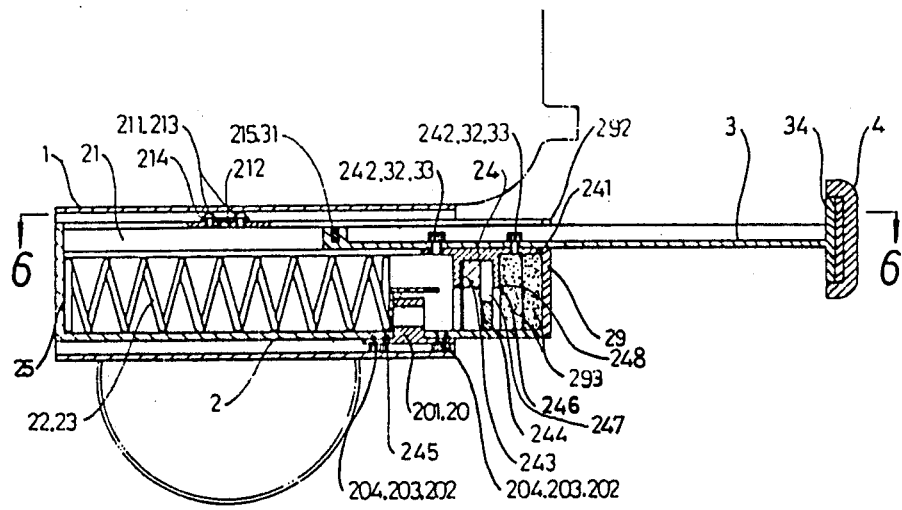
FIG. 7 is a cross-sectional view taken along line 7—7 of FIG. 6.

FIGS. 6 and 7 show the action of this bumper after the spring 23 recovers its position. The slide block 24 and the buffer 3 are extended forward by the spring 23, until the slide block 24 surpasses the location of the stop block 201 and collides with the sponge 293. In doing this, it is quite probable that the reverse L-shaped plate 245 is broken or detained at one side of the stop block 201. Thus, the limit plate 244 falls down after it surpasses the stop block 201 and blocks the notch of the slide block 24. In other words, said plate 244 falls on the bottom of the lower guide way 22 (situated lower than the stop block 201) so that the buffer 3 cannot retreat even if the buffer 3 should be moved back because the slide block 24 is hampered by the stop block 201.

In general, the structure of this bumper is equipped with proper shock absorbing action in case of collision, and the shock force is at the first time absorbed by the coiled spring 23 and at the second time responded directly by the bumper itself. Therefore, repeated fast shocks can be avoided to decrease the harm to the car, the driver or the passengers in the car as much as possible. Especially, the first shock force is absorbed by the breaking of of the pins 215 and the compression of the spring 23, which may be considered to be the best method of shock absorbing.

What is claimed is:

1. A two-stage automobile bumper assembly for an automobile having a chassis comprising:
    two outer supporting frames respectively welded at right and left sides of a front of the chassis, each said outer supporting frame containing an inner supporting frame and being provided with a flange at a front end which said flange is bored with round holes for assembling each said outer supporting frame with the associated said inner supporting frame;
    each said inner supporting frame contained in the respective said outer supporting frame being provided with (a) an upper guide way, (b) a lower guide way, (c) a buffer received in said upper guide way, (d) a coiled spring received in said lower guide way, (e) a slide block also received in said lower guide way and being attached at a bottom of the buffer such that said slide block can move along the lower guide way, (f) a rectangular hole bored vertically through a bottom of said inner supporting frame into said lower guide way, and (g) a stop block inserted in and extending through said rectangular hole and thus extending in said lower guide way;
    each said buffer contained in a respective said upper guide way of the respective inner supporting frame being attached together with the respective said inner supporting frame by means including two pins and positioning holes in said buffer for screws to pass therethrough in further attaching the slide block to said buffer, said slide block being provided with (a) a limit plate, (b) a reverse L-shaped plate by which said limit plate is constrained, and (c) a faceplate provided at a front end of said buffer for attaching said buffer with a bumper by means of screws and holes; and
    such that when the bumper receives a shock, the pins keeping the buffers steady with the respective inner supporting frames are cut into two pieces so that the buffers are pushed backward to compress the respective coiled springs, and then the springs automatically extend back pushing the buffers forward, respective said slide blocks then surpassing the respective said stop blocks whereby respective said reverse L-shaped plates fall down so that the respective limit plates fall down to block the respective buffers from going backward once again without restraint.

2. The two-stage automobile bumper assembly as claimed in claim 1, wherein each said inner supporting frame includes an empty hole between the upper and the lower guide ways, said slide block extending into and moving along the empty hole.

3. The two-stage automobile bumper assembly as claimed in claim 1, wherein each said slide block is hollow and reverse U-shaped to form a notch, contains a reverse U-shaped block together with said limit plate which are both constrained therein by said reverse L-shaped plate so that the notch of the slide block normally passes over the stop block set in the lower guide way.

4. The two-stage automobile bumper assembly as claimed in claim 1, wherein the reverse L-shaped plate of each said slide block includes a standing-up part and a horizontal part, said reverse L-shaped plate resting on a bottom of the lower guide way with the standing-up part and extending to a limit steel wire attached to the slide block with the horizontal part so that the limit plate is initially supported by and then falls down off of the horizontal part to a bottom of the slide block after the reverse L-shaped plate is separated from the stop block when the buffer moves forward.

* * * * *